United States Patent Office 3,258,355
Patented June 28, 1966

3,258,355
CARBON BLACK PROCESS AND PRODUCT
Andries Voet, Borger, Tex., assignor to J. M. Huber Corporation, Locust, N.J., a corporation of New Jersey
No Drawing. Filed Aug. 26, 1963, Ser. No. 304,606
6 Claims. (Cl. 106—307)

This application is a continuation-in-part of applicant's co-pending application Serial No. 252,572, filed January 21, 1963, which in turn is a continuation-in-part of Serial No. 240,746, filed November 28, 1962, and now abandoned.

The present invention relates to a process of producing a pelletized carbon black and products resulting therefrom. More specifically, this invention relates to the production of carbon black in the form of pellets which are readily dispersed in ink vehicles to produce news ink.

Carbon black conventionally produced from decomposition of hydrocarbons has a density of only about 3 pounds per cubic foot. Such carbon black is readily dispersed in fluid vehicles for printing inks. However, the points of manufacture of carbon black are usually far removed geographically from the points of its incorporation into printing ink and the required transportation of the carbon black forms an important part of its cost. A densified, pelletized form of carbon black is used commercially in the manufacture of printing inks, not only because of its lower transportation cost, but particularly because it can be handled by automatic transport systems. Non-pelletized, "fluffy" carbon black must be packed in bags and requires manual handling, vastly increasing its cost over pelletized blacks. The non-pelletized "fluffy" carbon black gives rise to severe dust problems in handling.

The dusting problem is only partially alleviated by packing such blacks in bags carrying about twelve pounds each. The use of bags does not alleviate the limited amount of such "fluffy" carbon black that can be transported in any one freight car. Furthermore, bagging of such "fluffy" black gives rise to the problem of "clingage" to the walls of the bags.

Various methods, such as compressing as well as pelletizing, have been used for increasing the apparent density of the "fluffy" carbon black. While successful in increasing the density of such blacks and also largely eliminating the dusting problem, the pellets are difficult to disperse in news ink vehicles. Also, the properties of the carbon black are changed by the conventional pelletizing process, and subsequent dispersion to such an extent that inks with modified flow characteristics are formed.

It is, therefore, an object of this invention to provide a method of preparing carbon black pellets which readily disperse in news ink vehicles.

Another object of this invention is to provide carbon black pellets which are readily dispersed in news ink vehicles.

A further object of this invention is to provide dust-free carbon black pellets having sufficient strength to allow efficient and convenient handling and transporting in automatic systems.

A still further object of this invention is to form a composition of matter comprising carbon black in pellet form having an agent incorporated therein which permits easy dispersion of the carbon black into news ink vehicles.

Another object of the invention is to provide a news ink incorporating carbon black pellets formed in accordance with the preceding objects.

Other objects and advantages will become apparent in the following specification.

My invention is generally practiced by thoroughly mixing a "fluffy" carbon black with a small quantity of tall oil pitch and, thereafter, pelletizing this mixture to a bulk or apparent density of about 14 to 25 pounds per cubic foot. The pellets so produced are strong and, yet, are readily dispersed in ink oil to form a commercially acceptable ink.

Tall oil is the material obtained by acidifying black liquor skimmings of alkaline paper pulp. It consists predominantly of rosin acids and fatty acids. The pitch remaining upon purification of the tall oil by means of distillation, consists predominantly of rosin acids and fatty acids with minor quantities of unsaponifiables, mostly hydrocarbons.

There are several methods by which the tall oil pitch of the invention can be homogeneously incorporated into the "fluffy" carbon black and subsequently pelletized. In one method as taught in my Patent No. 2,960,413 the carbon black in its "fluffy" form is mixed with a liquefied dispersing agent by adding the latter to the carbon black in a spray or in a suitable mixer, followed by thorough mechanical homogenization by means of a micronizer or similar equipment. The liquefaction of some of the dispersing agents can be accomplished by heating. Thereafter the mixture is pelletized in a conventional dry pelletizer. When using this method with the tall oil pitch of the invention, the tall oil pitch is heated to its softening point of about 70° C. to 90° C. In another equally effective method, carbon black pellets are formed by the wet process of pelletization. To this purpose, the tall oil pitch is emulsified in water. After the "fluffy" black has been water wetted in the pin mixer of the wet pelletizing equipment, the emulsion of the tall oil pitch is added, followed by wet pelletizing and drying.

A third method of producing satisfactory pellets is by saponifying the tall oil pitch with aqueous ammonia to form water-soluble ammonia salts of the acids present in the pitch; i.e., rosin acids and fatty acids. The solution of the ammonia salts can be used in place of the tall oil pitch emulsion in the wet pelletizing method. The unsaponifiable materials present in the pitch are emulsified in the water present. Upon drying, the ammonia salts are decomposed, restoring the tall oil pitch to its original form and depositing it upon the carbon black particles.

In every case, a homogeneous mixture is obtained in which the carbon black particles are coated with a very thin film of tall oil pitch. In the dry process the pelletizing completes the process. In the wet processes a secondary reaction takes place to form the thin film upon the carbon black particles. The drying of the wet pellets causes the emulsion film to break and the particles to coalesce, forming the thin film of tall oil pitch upon the carbon black particles. Also, upon drying above 100° C. the ammonium salts decompose, leaving a film of the original tall oil pitch on the carbon black particles. In every case, pellets of equally good dispersion in ink vehicles are formed.

The amount of tall oil pitch combined with the carbon black to form satisfactory dispersible pellets is limited only by the economics of the process. Usually, at least 2% by weight is satisfactory. However, the preferred range is advantageously from about 2 to 10% by weight based on the weight of the carbon black, although greater quantities are not harmful.

The process of pelletizing carbon black with tall oil pitch incorporated therein permits pellets of different densities to be formed. For example, if dispersion of the pellets is to be performed with roller mills, colloid mills or high shear agitators, a pellet density of 14 to 20 pounds per cubic foot is suitable. If a ball mill is used to disperse the carbon black, pellet densities as high as 25 pounds per cubic foot are suitable. Tall oil pitch treated pellets of suitable densities dispersed by any of the aforementioned methods can be dispersed in approximately one-fifth of the time required to disperse untreated carbon black pellets.

In forming the tall oil pitch treated carbon black pellets by the dry pelletizing process, it is possible to use a pitch solvent to fluidize the tall oil pitch rather than elevated temperatures. Such a solvent could be either volatile and be evaporated afterwards from the product, or be nonvolatile and remain in the pelletized black.

The aqueous solution of ammonium salts of the constituents of the tall oil pitch can be made in either concentrated or dilute form. Generally, the water used in the wet pelletizing process is added in two portions: the first is added immediately as conventional water used in pelletizing, the second is added after the black has been wetted in the pin mixer, as water of solution. The concentration of the solution is not critical to the process; however, it is advantageous to use a more concentrated solution, containing 30–40% solids.

The emulsions usually are not as concentrated as the salt solutions and contain preferably 20% solids. This emulsion can be easily produced by using an alkaline-reacting anionic emulsifying agent, advantageously an alkali aryl or alkyl sulfonate. Other types of emulsifying agents are also applicable; for example, nonionic agents such as polyoxyethylene glycol derivatives of fatty acids. The amount of emulsifying agent used ranges from 1% to 2% by weight. The emulsions are made with conventional emulsifying equipment such as high speed agitation, colloid mills, etc. The tall oil pitch is softened by heat and slowly added to the water at elevated temperatures accompanied by agitation.

The following examples are in no way restrictive, but are merely illustrative of the characteristic procedures used in the practice of this invention.

*Example I*

10 pounds of a "fluffy" furnace carbon black of an apparent density of 4 pounds per cubic foot was treated with 0.7 pound of tall oil pitch at 80° C. The mixture was homogenized in a hammer mill and then pelletized in a dry drum. The resulting pellets had an apparent density of 18 pounds per cubic foot.

A news ink was formed in which 1 pound of the resulting pellets was agitated by means of an electric stirrer in 9 pounds of a mineral ink oil at a temperature of 75° C. After 20 minutes of agitation, the pellets were completely disintegrated and the carbon black was completely dispersed in the oil. The residue on a 325 mesh screen was less than 0.007%.

*Example II*

10 pounds of a "fluffy" furnace carbon black of an apparent density of 4 pounds per cubic foot was combined with 10 pounds of water, followed by 2 minutes agitation in a pin mixer. 0.8 pound of tall oil pitch dissolved in 1.5 pounds of aqueous ammonia was then added to the mixer and agitation was continued for another 6 minutes, forming pellets which were dried at 150° C., having an apparent density of 18.5 pounds per cubic foot.

A printing ink was formed in which 1.5 pounds of these pellets were dispersed in 8.5 pounds of mineral ink oil in a high speed agitator operated for 30 minutes at 72° C. The residue on 325 mesh screen was less than 0.008%.

*Example III*

10 pounds of "fluffy" furnace carbon black of an apparent density of 4 pounds per cubic foot was combined with 9 pounds of water in a pin mixer for 3 minutes. 0.5 pound of an emulsion formed at 70° C. of 0.1 pound of tall oil pitch in 0.4 pound of water with .002 pound of polyethylene glycol mono-oleate as an emulsifying agent with the pH adjusted to 8.0 with ammonia, was added to the carbon black-water mixture and the agitation was continued for 5 additional minutes, forming pellets. The resulting pellets were dried at 165° C. and had an apparent density of 19 pounds per cubic foot.

An ink was formed in which 1.5 pounds of the resulting pellets were dispersed in 8.5 pounds of linseed oil at 75° C. by mixing in a high speed agitator for 20 minutes. The residue on a 325 mesh screen was less than 0.003%.

Under the same conditions as the examples ink formed from carbon black pellets, produced in the conventional manner without the tall oil pitch binder, and dispersed in ink oil, was unsatisfactory due to the presence of much gritty, undispersed material and the residue on a 325 mesh screen was over 3%, making the ink unusable.

From the above examples and foregoing description, it is apparent that, by my invention, I have produced new and valuable pellets having novel and desirable properties which are capable of producing news inks of desirable properties. The pellets at the same time have sufficient strength to permit transportation and handling in the same manner as conventional pellets without any of the limitations of the "fluffy" blacks in transportation and handling.

Having thus described the preferred embodiments of the invention, it should be understood that other modifications and adaptations may be resorted to without departing from the scope of the appended claims.

I claim:

1. A process for forming furnace carbon black pellets which are readily dispersible in conventional news ink vehicles comprising first preparing a mixture consisting essentially of not more than 98 parts by weight of the carbon black and not less than 2 parts by weight of tall oil pitch dispersing agent by admixing a "fluffy" form of furnace carbon black particles and a liquid state of such dispersing agent and then pelletizing said mixture to an apparent density of 14 to 25 pounds per cubic foot of the pellets.

2. The process of claim 1 wherein the tall oil pitch is liquified by heating to from 70 to 90° C. before incorporating into the dry carbon black.

3. The process of claim 1 wherein the carbon black is water wetted and the tall oil pitch is saponified with ammonia before pelletization.

4. The process of claim 1 wherein the tall oil pitch is emulsified in water by the addition of 1 to 2% by weight of an emulsifying agent thereto before mixing with the carbon black, which is water wetted.

5. A carbon black pellet including not more than 98 parts by weight of furnace carbon black and not less than 2 parts by weight of tall oil pitch integrated throughout as a pellet binding material.

6. A carbon black pellet including not more than 98 parts by weight of furnace carbon black and not less than 2 parts by weight of tall oil pitch integrated throughout as a pellet binding material, said pellets having an apparent density of about 14 to about 25 pounds per cubic foot of pellets.

References Cited by the Examiner

UNITED STATES PATENTS

| | | | |
|---|---|---|---|
| 2,891,872 | 6/1959 | Voet | 106—307 |
| 2,908,586 | 10/1959 | Braendle et al. | 106—407 |
| 2,960,413 | 11/1960 | Voet | 106—307 |

TOBIAS E. LEVOW, *Primary Examiner.*

J. E. POER, S. E. MOTT, *Assistant Examiners.*